US012619333B2

(12) United States Patent
Chen et al.

(10) Patent No.: US 12,619,333 B2
(45) Date of Patent: May 5, 2026

(54) GRIP REJECTION HOST PROCESSING

(71) Applicant: STMicroelectronics International N.V., Geneva (CH)

(72) Inventors: Bowei Chen, Shenzhen (CN); Pan Wang, Shenzhen (CN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/463,990

(22) Filed: Sep. 8, 2023

(65) Prior Publication Data

US 2025/0085812 A1    Mar. 13, 2025

(51) Int. Cl.
*G06F 3/041*     (2006.01)
*G06F 3/0488*    (2022.01)
*G06F 9/451*     (2018.01)
G06F 3/044      (2006.01)
G06F 3/0481     (2022.01)
G06F 3/0484     (2022.01)
G06F 3/04883    (2022.01)

(52) U.S. Cl.
CPC ........ G06F 3/04186 (2019.05); G06F 3/0488 (2013.01); G06F 9/451 (2018.02); *G06F 3/0446* (2019.05); *G06F 3/0481* (2013.01); *G06F 3/0484* (2013.01); *G06F 3/04883* (2013.01); *G06F 2203/04104* (2013.01); *G06F 2203/04108* (2013.01)

(58) Field of Classification Search
CPC .. G06F 3/04186; G06F 3/0488; G06F 3/0446; G06F 2203/04104; G06F 2203/04108; G06F 9/451; G06F 3/0481; G06F 3/0484; G06F 3/04883
See application file for complete search history.

(56) References Cited

U.S. PATENT DOCUMENTS

| | | | |
|---|---|---|---|
| 8,674,958 B1 | 3/2014 | Kravets | |
| 10,254,879 B1* | 4/2019 | Oral | G06F 3/0446 |
| 10,296,146 B2 | 5/2019 | Winebrand et al. | |
| 2012/0242617 A1* | 9/2012 | Lee | G06F 3/0418 |
| | | | 345/173 |
| 2012/0262407 A1* | 10/2012 | Hinckley | G06F 3/04883 |
| | | | 345/173 |
| 2013/0207913 A1* | 8/2013 | Takashima | G06F 3/0488 |
| | | | 345/173 |
| 2013/0234978 A1 | 9/2013 | Ksondzyk | |

(Continued)

OTHER PUBLICATIONS

"MaXTouch™ 1386-channel Touchscreen Controller," mXT1386, Firmware 1.x, Atmel®, maXTouch™, 9584LX-AT42, Jul. 2011, 74 pages.

*Primary Examiner* — Adam J Snyder
(74) *Attorney, Agent, or Firm* — Slater Matsil, LLP

(57) ABSTRACT

An example grip rejection method includes detecting a touch on a touch screen, where the touch covers an area of the touch screen. The grip rejection method includes in response to detecting a touch, determining touch coordinates representing the touch area with a touch controller. The grip rejection method includes in response to determining the touch coordinates with the touch controller, determining grip rejection information with the touch controller, where the grip rejection information includes signal strength information of the touch. The grip rejection method includes transmitting the touch coordinates and the grip rejection information of the touch.

18 Claims, 6 Drawing Sheets

100

601

602

(56) References Cited

U.S. PATENT DOCUMENTS

| | | |
|---|---|---|
| 2014/0306903 A1 | 10/2014 | Huang |
| 2016/0266674 A1* | 9/2016 | Schropp, Jr. ........ G06F 3/04186 |
| 2018/0224963 A1* | 8/2018 | Lee .................... G06F 3/04142 |
| 2021/0096725 A1* | 4/2021 | Garg .................... G06F 3/0446 |
| 2022/0171519 A1 | 6/2022 | Garg et al. |
| 2023/0028906 A1 | 1/2023 | Yoder et al. |

* cited by examiner

100

104

100

601

602

| | Bit7 | Bit6 | Bit5 | Bit4 | Bit3 | Bit2 | Bit1 | Bit0 |
|---|---|---|---|---|---|---|---|---|
| Byte 0 | Reserved | | Touch ID | | | | | 0x2 |
| Byte 1 | Minor | | | | | | | |
| Byte 2 | Major | | | | | | | |
| Byte 3 | Edge signal strength ratio | | | | | | | |
| Byte 4 | Node count | | | | | | | |
| Byte 5 | Max value[7:0] | | | | | | | |
| Byte 6 | Max value[15:8] | | | | | | | |
| Byte 7 | Reserved | | Event left count | | | | | |

810 — DETECT A TOUCH ON A TOUCH SCREEN, THE TOUCH COVERING AN AREA OF THE TOUCH SCREEN

820 — DETERMINE TOUCH COORDINATES WITH A TOUCH CONTROLLER

830 — DETERMINE GRIP REJECTION INFORMATION WITH THE TOUCH CONTROLLER

840 — TRANSMIT THE TOUCH COORDINATES AND THE GRIP REJECTION INFORMATION OF THE TOUCH

GRIP REJECTION HOST PROCESSING

TECHNICAL FIELD

The present invention relates to the field of computer interaction, specifically to a grip rejection method for input devices.

BACKGROUND

In various human-computer interaction scenarios, touch-based input devices (such as touch screens) have become prevalent due to their intuitive and natural user interface. However, a common challenge associated with touch-based input devices is the occurrence of unintentional or false touches, which can lead to erroneous input and degrade the user experience. This problem is particularly significant in applications where the user's fingers or palm are expected to hover or rest near the touch-sensitive surface without triggering input events.

To address this issue, existing solutions typically rely on software-based algorithms executed by a touch controller that attempt to differentiate between intentional touch gestures and accidental touches. These algorithms often involve complex signal processing techniques and heuristic rules to interpret touch patterns and determine the user's intention accurately. However, these approaches are prone to false positives or false negatives, resulting in either missed inputs or unwanted activations.

SUMMARY

In accordance with a preferred embodiment of the present invention, a grip rejection method includes detecting a touch on a touch screen, where the touch covers an area of the touch screen. The grip rejection method includes in response to detecting a touch, determining touch coordinates representing the touch area with a touch controller. The grip rejection method includes in response to determining the touch coordinates with the touch controller, determining grip rejection information with the touch controller, where the grip rejection information includes signal strength information of the touch. The grip rejection method includes transmitting the touch coordinates and the grip rejection information of the touch.

In an embodiment, an electronic device includes a touch screen, and a touch controller coupled to a memory storing instructions to be executed in the touch controller. The instructions when executed cause the touch controller to detect a touch on a touch screen, the touch covering an area of the touch screen. The instructions when executed further and in response to detecting a touch, determine touch coordinates representing the touch area with the touch controller. The instructions when executed further and in response to determining the touch coordinates with the touch controller, determine grip rejection information with the touch controller, where the grip rejection information includes signal strength information of the touch. The instructions when executed further transmit the touch coordinates and the grip rejection information of the touch.

It is to be understood that both the foregoing general description and the following detailed description are exemplary only and are not restrictive of the disclosure as claimed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
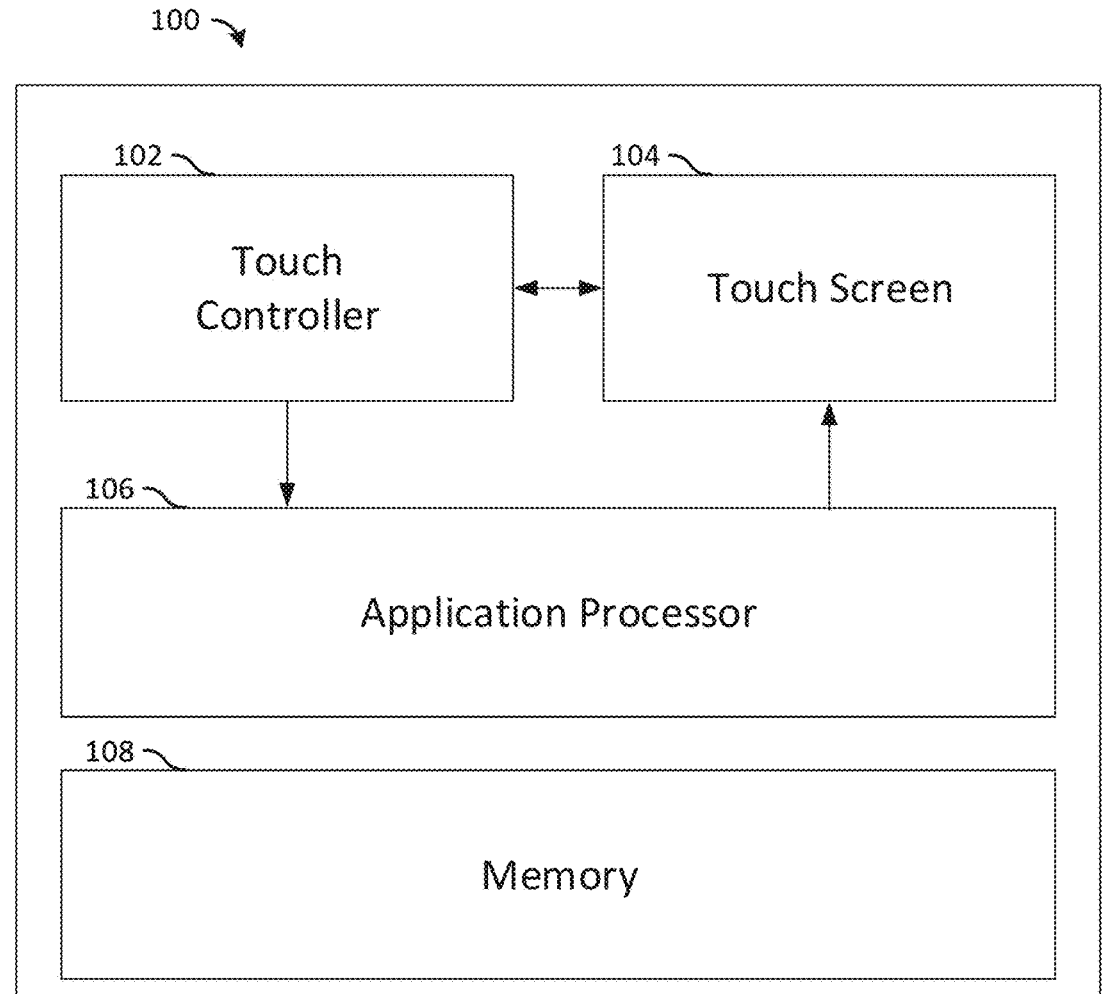
FIG. 1 is a component schematic diagram of an electronic device that performs grip rejection in an application processor used in accordance with some embodiments.

Embodiments of this application pertain to systems and methods for detecting and rejecting unintentional or unwanted grips on input devices, such as touch screens, touch pads, or other interactive surfaces.

Grip rejection algorithms differentiate between intentional touch inputs and unintended touches caused by a user's grip or accidental contact with an electronic device's touch screen. These algorithms utilize the touch screen's ability to sense multiple touch points simultaneously.

Typically, to implement a grip rejection algorithm, a touch controller analyzes various factors such as touch pressure, duration, and the number and distribution of touch points. By considering these parameters, the grip rejection algorithm distinguishes deliberate touches from inadvertent touches resulting from the user holding the device.

For example, when a user firmly grips the electronic device with the touch screen (such as a mobile phone or a tablet) with their hand, the grip rejection algorithm detects the continuous presence of multiple touch points over a prolonged period. It recognizes that these multiple touch points are not intentional inputs and discards them, preventing unintended interactions with the electronic device. In contrast, when the user intentionally interacts with the screen, the grip rejection algorithm accurately detects and responds to the desired touch inputs.

Grip rejection algorithms enhance the user experience by reducing false touches and improving the accuracy of touch recognition. They are particularly useful in scenarios where touch screens are small or bezel-less, or for thin electronic devices, all of which increase the likelihood of unintentional touches.

By leveraging the capabilities of touch screens and employing sophisticated grip rejection algorithms, electronic devices provide more reliable and precise touch interactions, making them more intuitive and user-friendly.

Conventional grip rejection algorithms are implemented in the touch controllers of electronic devices with a touch screen, which limits the grip rejection algorithm's accuracy and performance. This is due to current grip rejection algorithms not incorporating the additional information that is known by the application processor of the electronic device. The additional information known by the application processor comprises the electronic device's orientation status (horizontal or vertical), a grip rejection dynamic valid area (different applications may have different areas of the touch screen in which touch inputs are rejected), and what specific applications are executing. As a result, grip rejection algorithms that are executed solely by the touch controller miss an opportunity to significantly improve their accuracy and performance by incorporating the additional information of the application processor.

The system of this disclosure is an electronic device that executes grip rejection algorithms in the application processor. The grip rejection method of this disclosure transmits the touch coordinates and the grip rejection information determined by the touch controller to the application processor, and the application processor implements grip rejection algorithms that use the touch coordinates, the grip rejection information, and information known by the application processor for grip rejection determination. The application processor implements grip rejection algorithms that use the information from the touch controller in combination with the application information to determine whether to pass or reject a touch event. This differs from typical grip rejection methods, where the typical method only uses the information from the touch controller and executes the grip rejection algorithms in the touch controller to determine whether to pass or reject a touch event.

FIG. 1 illustrates an electronic device 100 capable of implementing the grip rejection method of this disclosure. The electronic device 100 is capable of determining whether to pass or reject a touch event on a touch screen 104 by implementing grip rejection algorithms in an application processor 106. The grip rejection method uses grip rejection information and touch coordinate information passed to the application processor 106 by a touch controller 102, and uses the additional information known to the application processor 106 to determine to pass or reject a touch event. The electronic device 100 comprises the touch screen 104, the touch controller 102, the application processor 106, and a memory 108. The electronic device 100 may be any device comprised of the elements mentioned above, such as a smart phone, or a tablet.

The touch screen 104 is a display device for displaying various applications (for example, phone communication, data transmission, broadcasting, camera and the like) and sense different touch inputs on the electronic device 100 which are processed by the touch controller 102. The touch screen 104 acting as a display device provides a user interface that can be configured to adapt to various applications, and may receive at least one touch event through a user's body (for example, fingers including a thumb). The user interface may include a predetermined touch area. The touch screen 104 transmits an electrical signal corresponding to the touch event through the user interface to the touch controller 102. The touch screen 104 may be implemented any type of touch screen, such as resistive touch screens, capacitive touch screens, surface acoustic wave (SAW) touch screens, infrared touch screens, and optical touch screens. All of which comprise a touch controller that implements grip rejection algorithms.

Resistive touch screens comprise two flexible layers coated with a resistive material and separated by a small gap. When the touch screen is pressed, the top layer contacts the bottom layer at the touch point, completing an electrical circuit. The layers comprise polyester or similar materials with a resistive coating. The touch controller applies a small voltage to the layers, and when a touch occurs, the voltage at the point of contact changes. By measuring the voltage change, the touch controller calculates the coordinates of the touch.

Capacitive touch screens utilize the principle of electrostatic capacitance. They comprise a transparent material, often glass, with a grid of electrodes. When a conductive object, like a finger, touches the touch screen, the electrostatic field around the touch screen changes. The change in the electrostatic field alters the capacitance at the touch point. The touch controller measures the capacitance at each touch point and calculates the touch coordinates based on the changes in capacitance. Capacitive touch screens offer multi-touch capabilities and are known for their responsiveness.

SAW touch screens employ ultrasonic waves that are transmitted across the surface of the touch screen. The touch screen comprises two transducers and reflectors positioned along the edges. When the touch screen is touched, the sound waves are absorbed, causing a decrease in the transmitted signal. The touch controller detects this decrease and determines the touch location based on the time it takes for the waves to reach the receiving transducer. SAW touch screens offer excellent optical clarity, high touch accuracy, and can support multiple touch points simultaneously.

Infrared touch screens comprise an array of infrared LED emitters and photodetectors placed around the touch screen's edges. The emitters create an invisible grid of infrared light beams across the touch screen surface. When an object touches the touch screen, the infrared beams are interrupted, and the photodetectors detect the interruption. The touch controller analyzes the interrupted beams and calculates the touch position based on the detected interruptions. Infrared touch screens are durable, reliable, and can work with any object that interrupts the beams, such as a finger or stylus.

Optical imaging touch screens comprise cameras or image sensors positioned behind the touch screen to capture images. When the touch screen is touched, the cameras detect the changes in light patterns caused by the contact. The touch controller analyzes the captured images and identifies the touch position based on the variation in light patterns. Optical imaging touch screens offer high touch accuracy, support multi-touch gestures, and can work with any input object that blocks or alters the light, making them versatile and suitable for various applications.

Any touch events that occur on the touch screen 104 are processed by the touch controller 102. The touch controller 102 continuously scans the touch screen 104, detects touch events, converts them into digital signals, calculates the touch position, and communicates the information to the electronic device's 100 application processor 106. The application processor 106 then interprets the touch event and triggers the appropriate actions or responses, allowing users to interact with applications, navigate menus, draw, type, or perform various other tasks directly on the touch screen 104.

The touch controller 102, also known as a touchscreen controller or touch sensor controller, is an integral component of a touch screen system. The touch controller 102 interprets and translates the touch event detected on the touch screen 104 into digital signals that are processed by the electronic device's 100 application processor 106.

The touch controller 102 acts as an intermediary between the touch screen 104 and the electronic device's 100 application processor 106. The touch controller 102 serves as the interface that converts physical touch interactions into digital data, enabling the electronic device 100 to recognize and respond to user input accurately.

The touch controller 102 continuously scans the touch screen 104 to detect any touch or contact. The touch controller 102 monitors the electrical properties of the touch screen 104, such as changes in capacitance, resistance, or optical properties, depending on the touch screen technology employed (e.g., capacitive, resistive, infrared). When a touch event is detected, the touch controller 102 registers the coordinates and other relevant information of the touch event. The other relevant information of the touch event that the touch controller 102 registers is the grip rejection information.

The grip rejection information of the touch event comprises a minor width, a major width, a maximum signal strength, a node count, and an edge signal strength ratio. The minor width is the width of the touch in the smallest width side of the electronic device 100. The major width is the width of the touch in the largest width side of the electronic device 100. The minor width side may be in a direction orthogonal to the direction of the major width side of the electronic device 100. The maximum signal strength is the largest signal value detected on the touch screen 104 from the touch event. The node count is the number of nodes of the touch screen 104 that are covered by the touch event. And the edge signal strength ratio is a ratio of the sum of the outer edge signal strengths of the touch event compared to the sum of the inner edge signal strengths of the touch event.

The touch controller 102 converts the analog signals received from the touch screen 104 into digital signals that can be processed by the electronic device's 100 application processor 106. The touch controller 102 performs analog-to-digital conversion, sampling the analog touch data at a high frequency and quantizing it into digital values representing the position and characteristics of the touch, as well as the grip rejection information mentioned above.

Based on the digital touch data received, the touch controller 102 calculates the precise coordinates of the touch point on the touch screen 104 of the touch event. In embodiments, the touch controller 102 applies algorithms to interpret the position, pressure, size, and other attributes of the touch event.

In addition to basic touch detection, touch controllers incorporate gesture recognition capabilities as well as grip rejection capabilities. The touch controller 102, using gesture recognition algorithms, can identify and interpret gestures such as swipes, pinches, rotations, and multi-finger gestures, providing enhanced functionality and user interaction possibilities. The touch controller 102, using grip rejection algorithms, can also identify and interpret the types of grips on the electronic device 100 associated with a specific user.

However, in this disclosure, the touch controller 102 does not determine whether to reject or pass a touch event using a grip rejection algorithm in the touch controller. The touch controller 102 of this embodiment determines the touch coordinates and the grip rejection information of the touch event. The touch controller 102 then sends the touch coordinates and the grip rejection information in two separate events to the application processor 106 of the electronic device 100.

The touch controller 102 communicates with the electronic device's 100 application processor 106, transmitting the processed touch data for further processing. The touch controller 102 may employ standard communication protocols such as I2C (Inter-Integrated Circuit) or SPI (Serial Peripheral Interface) to transfer the touch information to the electronic device's 100 application processor 106.

The touch controller's 102 performance and capabilities significantly impact the touch screen's 104 responsiveness, accuracy, and overall user experience. Advanced touch controllers employ sophisticated algorithms and signal processing techniques to improve touch detection accuracy, reject unintended touches or palm contact, and enhance gesture recognition capabilities.

It is important to note that the touch controller 102 is distinct from the touch screen 104, which physically detects the touch input. The touch controller 102 complements the touch screen 104 by converting the raw touch data into usable digital signals that can be understood by the electronic device 100, facilitating seamless touch interaction and enabling a wide range of touch-based applications and functionalities.

Once the touch coordinates and the grip rejection information have been processed by the touch controller 102, the touch coordinates and the grip rejection information are transferred in two separate events to the application processor 106.

The application processor 106 is a key component in electronic devices such as smartphones, tablets, smartwatches, and other portable devices. The application processor 106 comprises a system-on-a-chip (SoC) designed to handle the computational and processing tasks associated with running applications and executing the electronic device's 100 operating system.

The application processor 106 serves as the brain of the electronic device 100, responsible for executing instructions and managing the electronic device's 100 overall performance. The application processor 106 may comprise various components, including one or more central processing units (CPUs), graphics processing units (GPUs), memory controllers, input/output interfaces, multimedia accelerators, and other specialized processing units, in an embodiment.

The primary function of the application processor 106 is to execute software applications, enabling the electronic device 100 to perform tasks such as web browsing, running productivity tools, playing games, streaming media, and running various other software programs. The application processor 106 interprets and executes instructions provided by the operating system and applications, managing tasks, allocating system resources, and coordinating communication between different components of the electronic device 100.

The application processor 106 is typically optimized for power efficiency and performance, striking a balance between processing capabilities and energy consumption to ensure optimal battery life and user experience. The application processor 106 comprises multiple cores, allowing for parallel processing and improved multitasking capabilities, in an embodiment.

In addition to executing software applications, the application processor 106 may also execute other functions such as managing device connectivity (e.g., Wi-Fi, cellular data), processing sensor inputs (e.g., accelerometer, gyroscope), and controlling multimedia processing (e.g., video decoding, image processing). The application processor 106 provides the necessary processing power and computational resources to enable a wide range of functionalities and features in modern electronic devices.

In this disclosure, the application processor 106 implements the grip rejection algorithms. The application processor 106 uses grip rejection algorithms that incorporate the application information (the application information comprising information known by the application processor 106) in combination with the touch coordinate information and the grip rejection information that are provided by the touch controller 102 to determine to pass or reject a touch event.

In various embodiments, the embodiment grip rejection algorithms discussed herein in various embodiments may be executed at operating system (OS) level or lower such as at the kernel level to ensure security and having priority over other applications. By using the application processor 106 to perform the grip rejection algorithms, the electronic device 100 determines the grip status of the device with higher efficiency, and the overall performance of the grip rejection is improved. A more dynamic adjustment capability is available for grip settings when the application processor 106 performs the grip rejection algorithms. And, by implementing the grip rejection algorithms in the application processor 106, the touch controller 102 has more available memory for programming that can be used for algorithms or features to improve/optimize the touch performance.

Overall, the application processor 106 enables the functionality and performance of electronic devices, allowing users to interact with applications and services seamlessly. The application processor's 106 capabilities and efficiency contribute significantly to the user experience and determine the electronic device's 100 overall responsiveness and performance. The application processor 106 executes the instructions or programs that are stored in memory 108.

Memory 108 may be any component or collection of components adapted to store programming, event information, or instructions for execution by the application processor 106. The memory 108 may store the grip rejection method of this disclosure for execution by the application processor 106. The memory 108 may also store instructions for execution by the touch controller 102. In an embodiment, memory 108 includes a non-transitory computer-readable medium. The non-transitory computer-readable medium includes all types of computer-readable media, including magnetic storage media, optical storage media, flash media, and solid-state storage media.

It should be understood that software can be installed in and sold with electronic device 100. Alternatively, the software can be obtained and loaded into electronic device 100, including obtaining the software through a physical medium or distribution system, including, for example, from a server owned by the software creator or from a server not owned but used by the software creator. The software can be stored on a server for distribution over the Internet, for example.

In embodiments, memory 108 is a dedicated memory storage for storing instructions or data specific to determining grip rejection information and determining whether to pass or reject a touch event. In other embodiments, memory 108 may refer to existing memory storage to store touch coordinates and grip rejection information of a touch event made by the touch controller 102. In other embodiments, memory 108 may have the functionality of both of the previous embodiments.

The touch screen 104 may be further explained by its comprising layers. In an embodiment, the touch screen 104 comprises a touch sensing layer and a display layer, and such an embodiment is illustrated in FIG. 2.

Figure 2:
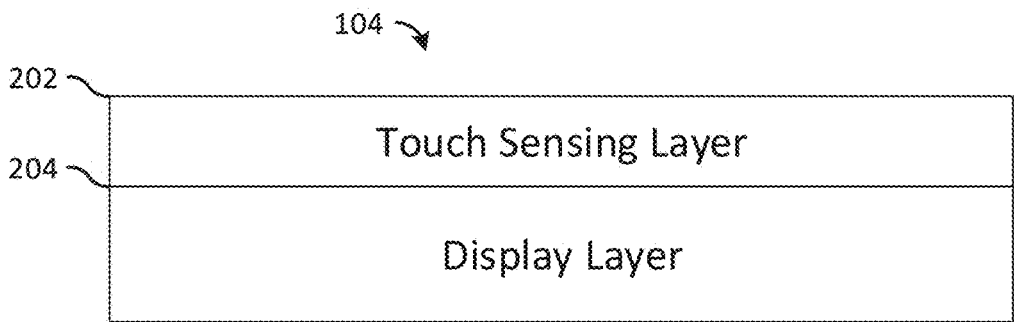
FIG. 2 is a component schematic diagram of a touch screen used in accordance with some embodiments.

FIG. 2 illustrates the layers of the touch screen 104 of electronic device 100 in an embodiment. The touch screen 104 comprises a touch sensing layer 202 that is combined with a display layer 204. The touch sensing layer 202 detects touch events on the touch screen 104. The display layer 204 displays applications that the electronic device is executing, such as an application output, or other form of a graphical user interface (GUI).

The touch sensing layer 202 comprises touch sensors. Touch sensors used to form a touch sensing layer 202 of a touch screen 104 are typically of the grid type classification. In the grid type of touch sensor, there are two sets of parallel electrodes, commonly referred to as X and Y electrodes, that are arranged orthogonal to each other. A plurality of nodes is defined by intersections of pairs of X and Y electrodes, wherein the number of nodes is a product of the number of X electrodes and the number of Y electrodes. The grid type touch sensor is generally used for a touch screen of a mobile phone, a drawing board, and others.

In an embodiment, the touch sensing layer 202 is a capacitive touch sensing grid of small, transparent electrodes. An X-Y grid is formed by etching two separate, perpendicular layers of conductive material with parallel lines or tracks to form the grid. Everywhere the grid lines overlap, a capacitor is created. The human body is an electrical conductor and when a user touches the touch screen 104 with their finger, the sensor changes the local electric field which reduces the mutual capacitance. The capacitance change at every individual point on the grid is measured to accurately determine the touch location by measuring the voltage in the other axis.

The display layer 204 of the touch screen 104 comprises light emitting electronic devices (e.g., Light Emitting Diodes (LEDs)) that display active applications and other GUIs executing on the electronic device 100. Currently, the most common display technologies used for the display layer 204 integrated with touch sensors to form touch screens are Thin Film Transistor (TFT) Liquid Crystal Displays (LCDs) and Organic Light Emitting Diode (OLED) displays.

Figure 3:
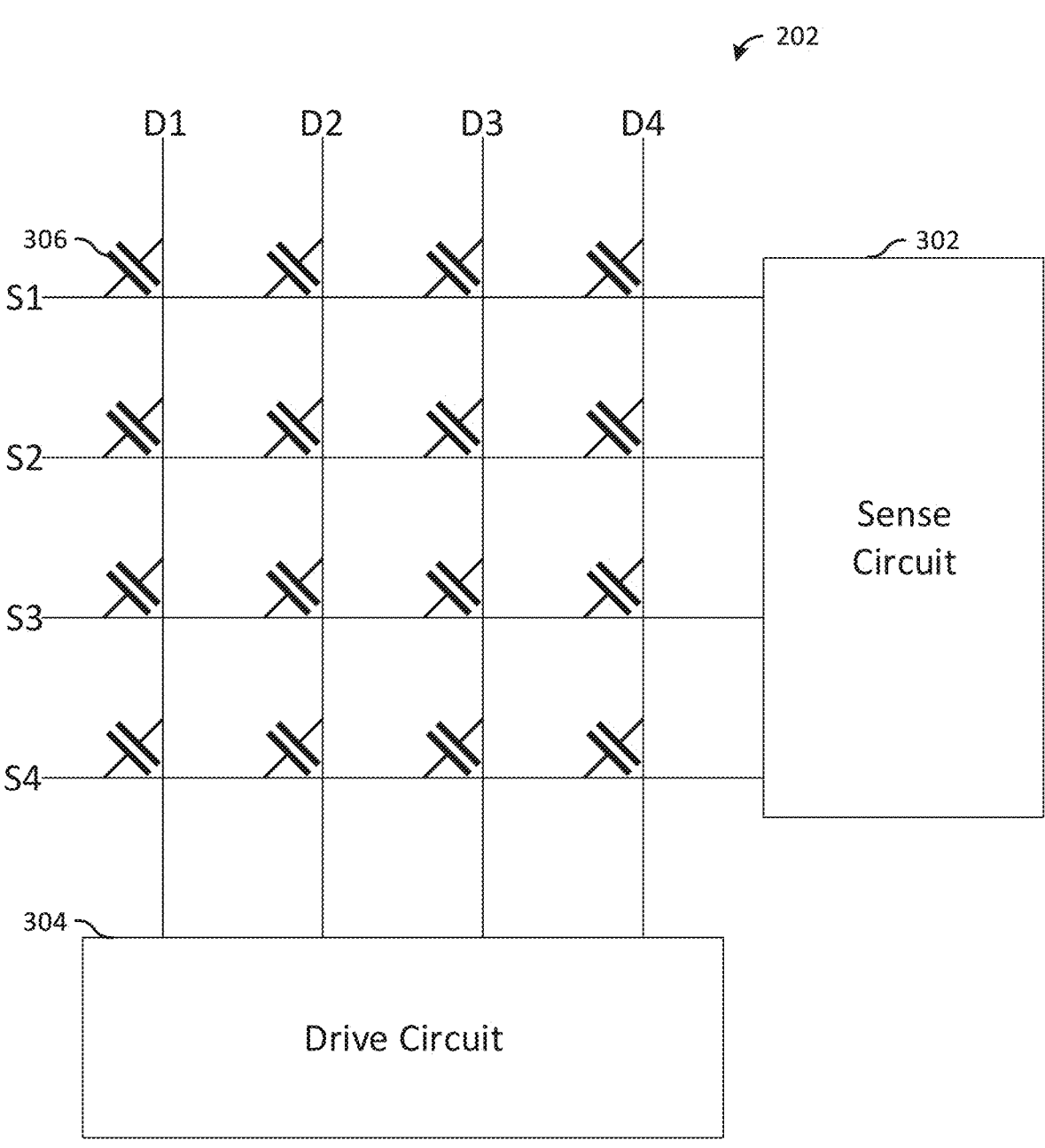
FIG. 3 is a component schematic diagram of a capacitive touch array in accordance with some embodiments.

An example embodiment of a touch sensing layer 202 of the capacitive type is illustrated in FIG. 3 and is discussed further in the detailed description of FIG. 3.

FIG. 3 illustrates an example touch sensing layer 202 of a touch screen 104. In this embodiment, the touch sensing layer 202 is a capacitive touch sensing layer. The touch sensing layer 202 is comprised of a grid formed from overlapping two separate, perpendicular layers of conductive material with parallel lines or tracks, and everywhere the lines overlap, a capacitor 306 is created. One of the separate parallel line layers of the grid is connected to a sense circuit 302, and the other separate parallel line layer is connected to a drive circuit 304. Shown in FIG. 3 are the horizontal sense circuit connection lines S1, S2, S3, and S4. Also shown in FIG. 3 are the vertical drive circuit connection lines D1, D2, D3, and D4. In FIG. 3, the grid of capacitors 306 is a four-by-four grid, but it should be understood that this is an illustrative example and the grid of capacitors can be much larger than what is shown. The four-by-four grid of FIG. 3 would correspond to a node count of the touch sensing layer 202 being 16 nodes in total.

Capacitive touch sensors can be classified into self-capacitance and mutual capacitance types. In the measurement of self-capacitance, the measured capacitance is between an electrode beneath a dielectric touch panel and a touch finger, or a stylus, or the like. A touch on the dielectric touch panel increases the effect of the capacitance of the electrode on the charging of a measurement capacitor forming part of the touch integrated circuit (IC) measurement circuit. Thus, the fingers and electrodes can be considered to be plates of a capacitor that form a dielectric with the touch panel. Self-capacitance type touch sensing layers have lower resolution than mutual capacitance types.

In the measurement of mutual capacitance, adjacent pairs of electrodes are arranged below the touch panel and form nominal capacitor plates. A touch control object, which may be an effective dielectric material (e.g., a dry finger or a plastic stylus), or in some cases may be conductive (e.g., a wet finger or a metal stylus), changes the capacitance associated with the electrode pair by displacing the environment (i.e., in most cases air, but possibly water or some other gas or liquid). One of the pair of electrodes is driven by a drive signal (e.g., a pulse train), which is output by the drive circuit 304, and the other electrode of the pair senses the drive signal, which is sensed by the sense circuit 302. The effect of touch is to attenuate or amplify the drive signal received at the sense circuit 302, i.e., to influence the amount of charge collected at the sense electrode. The change in mutual capacitance between the drive and sense electrodes provides a measurable signal. It is noted that in mutual capacitance grid sensors, there is a convention to label the drive electrodes as X electrodes and the sense electrodes as Y electrodes, although this choice is arbitrary. A perhaps clearer, frequently used label is to label drive electrodes as "Tx" for transmission and the sense electrodes as "Rx" similar to telecom symbols, although the label is of course specific to measurements of mutual capacitance.

The drive circuit 304 and sense circuit 302 work collaboratively in a capacitive touch screen to sense and interpret touch inputs accurately. The drive circuit 304 is responsible for generating the necessary electrical signals that create an electric field across the drive lines (D1-D4) of the touch sensing layer 202. The drive circuit 304 applies specific voltages or currents to the drive electrodes, which in turn create an electric field. When a user touches the screen, their finger or stylus disrupts this electric field, resulting in a change in capacitance.

The sense circuit 302, comprising sensing electrodes, is designed to detect these capacitance changes. The sense circuit 302 applies a low-level alternating current (AC) signal to the sensing electrodes, or sense lines (S1-S4) which interact with the altered electric field caused by the touch input. The sense circuit 302 monitors the resulting electrical characteristics, such as voltage, frequency, or phase shift. These changes are analyzed to determine the presence, location, and characteristics of the touch input by the touch controller.

The drive circuit 304 employed in capacitive touch screens plays a pivotal role in facilitating accurate and reliable touch input detection. The drive circuit 304 is responsible for generating the necessary electrical signals that drive the touch screen electrodes, or drive lines D1-D4. The drive circuit 304 is coupled to the drive lines (D1-D4). By applying specific voltages or currents to the drive lines (D1-D4), such as sine waves or square waves, the drive circuit 304 creates an electric field across the touch sensing layer 202. This electric field interacts with the conductive properties of a user's touch, resulting in a measurable change in capacitance of the capacitor 306 formed between the overlap of a drive line (D1-D4) and a sense line (S1-S4). The drive circuit 304 precisely controls the timing, voltage levels, and waveform characteristics to ensure optimal touch sensitivity and responsiveness. By carefully modulating the signals, the drive circuit 304 enables the touch controller to accurately detect and interpret touch inputs, enabling seamless user interaction and intuitive operation of the capacitive touch screen interface.

A sense circuit 302 is an integral component utilized in capacitive touch screens to accurately measure and interpret the electrical changes caused by user touch. Its primary function is to detect variations in capacitance resulting from the proximity or direct contact of a user's finger or stylus.

The sense circuit 302 comprises a series of sensing electrodes, or sense lines (S1-S4), typically located beneath the touch screen surface in the touch sensing layer 202, that are responsible for detecting these capacitance changes. By applying a low-level alternating current (AC) signal to the sensing electrodes (S1-S4), the sense circuit 302 can monitor the resulting electrical characteristics, such as voltage, frequency, or phase shift. This enables the sense circuit 302 to discern the presence and location of touch inputs with high precision. By analyzing the collected data, the sense circuit 302 cooperates with the touch controller 102 to accurately interpret the user's gestures and translate them into corresponding commands or actions, enhancing the overall touch screen performance and user experience.

The drive circuit 304 and sense circuit 302 work together in a synchronized manner. The drive circuit 304 generates the necessary signals to create the electric field, while the sense circuit 302 monitors and analyzes the resulting changes in capacitance of the capacitors 306. The touch controller 102, which receives inputs from the sense circuit 302, interprets the collected data and translates it into corresponding information. In the case of this disclosure, the touch controller 102 determines the grip rejection information and the touch coordinate information of the touch event and transmits that information as two separate events to the application processor. By employing grip rejection algorithms on the information provided by the touch controller 102 and combining the additional application information available to the application processor 106, the application processor 106 determines the grip rejection status of the touch event. In other embodiments, the touch screen technology comprises any type of touch screen that determines the same touch coordinate and grip rejection information. The grip rejection method of this disclosure is described in FIG. 4.

Figure 4:
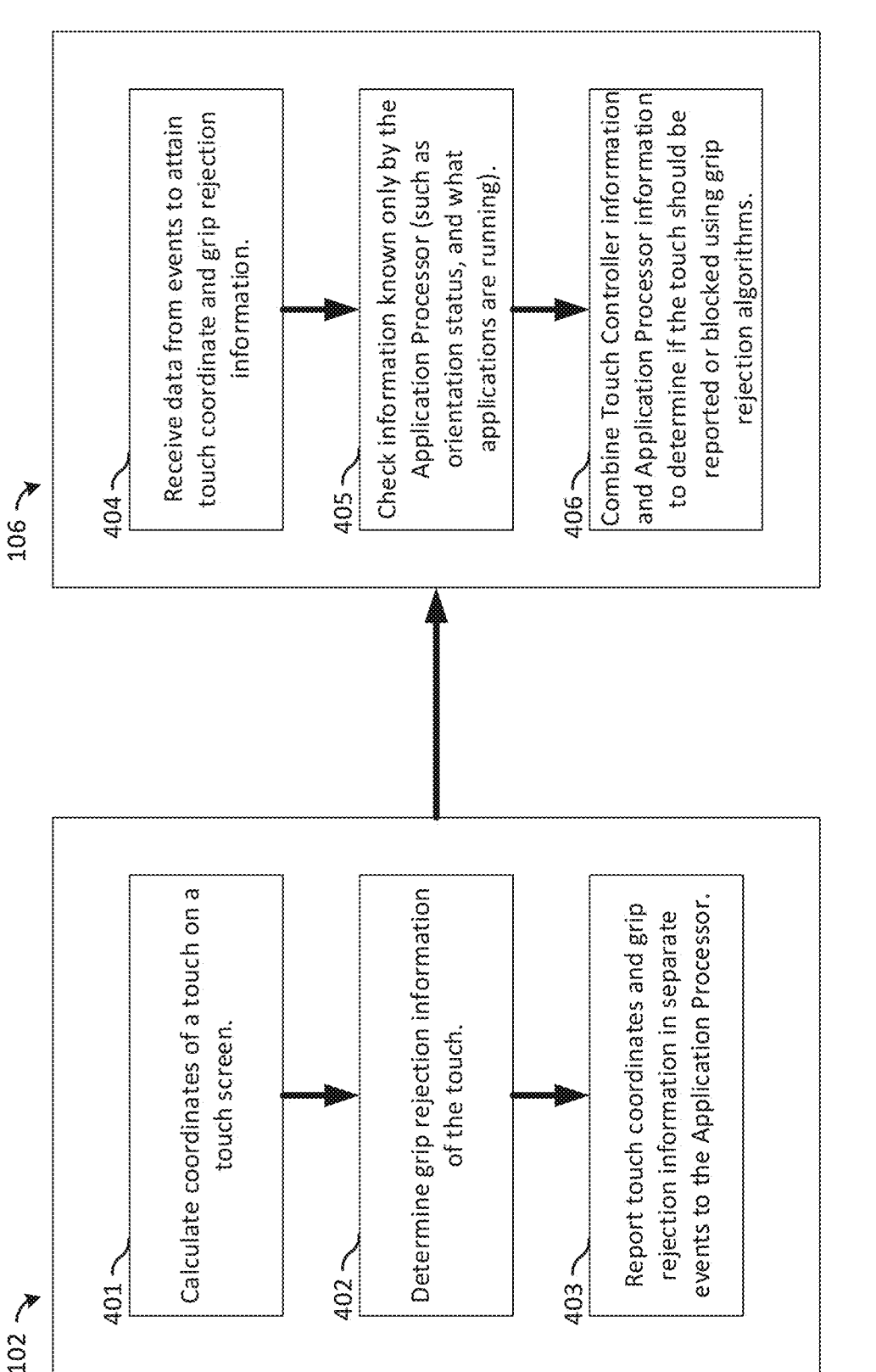
FIG. 4 is a flowchart of a grip rejection method in accordance with some embodiments.

FIG. 4 shows a flowchart of the grip rejection method of this disclosure in an embodiment. The processes are performed by either the touch controller 102 or the application processor 106 of the electronic device of this disclosure, and are separated into two boxes. The boxes within the large box (labeled 102) on the left are processes performed by the touch controller 102 of the electronic device. The boxes within the large box (labeled 106) on the right are processes performed by the application processor 106 of the electronic device.

The grip rejection method illustrated in FIG. 4 starts when a touch event is detected on the touch screen of the electronic device. Once the touch event is detected, the grip rejection method begins with the processes performed by the touch controller 102. The touch controller 102 processes start with box 401, wherein the touch controller 102 calculates the coordinates of the touch event on the touch screen.

After the touch controller 102 calculates the touch coordinates of the touch, the grip rejection method continues to box 402. In box 402, the touch controller 102 determines the grip rejection information of the touch. The grip rejection information includes the major width of the touch, the minor width of the touch, the maximum signal strength of the touch, the node count of the touch, and the edge signal strength ratio of the touch, which have been defined above. Once the grip rejection information is determined by the touch controller 102, the grip rejection method proceeds to box 403.

Figures 6, 7:
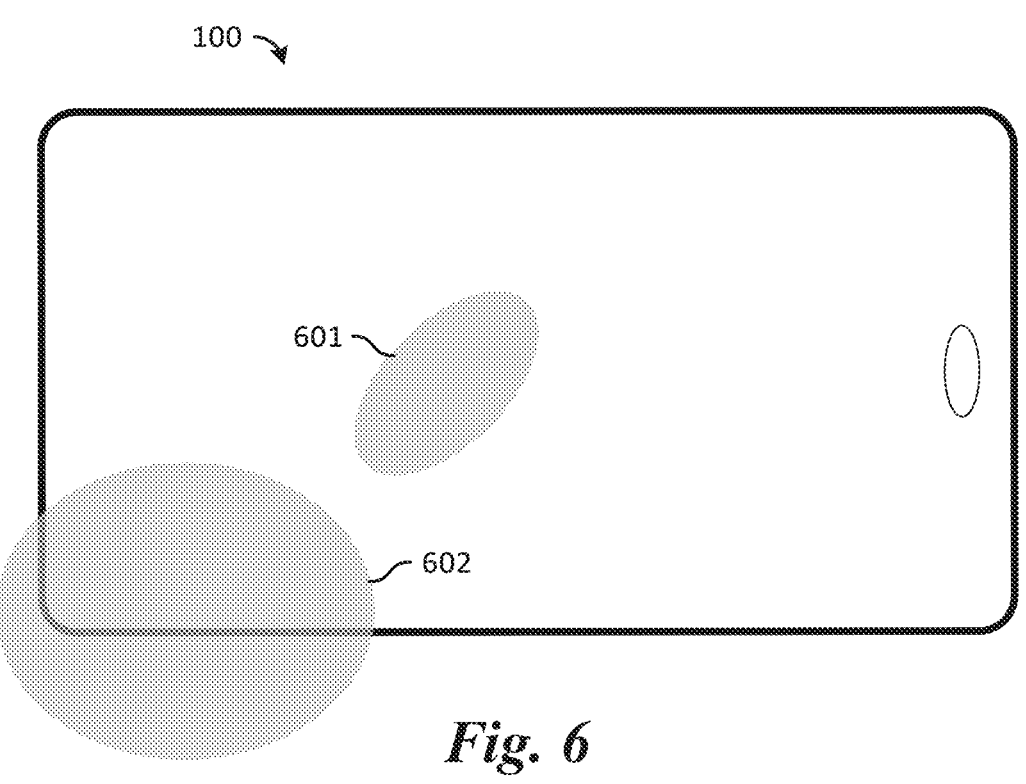
FIG. 6 is an illustration of a touch on an electronic device with a touch screen in accordance with some embodiments.
FIG. 7 is a table illustrating the storing of touch event information in memory in accordance with some embodiments.

In box 403, the touch controller 102 reports the touch coordinates and the grip rejection information of the touch to the application processor 106. The touch coordinates are sent to the application processor 106 in a separate event from the grip rejection information. Two separate events are sent to the application processor, where the first event contains the touch coordinates and the second event contains the grip rejection information. For example, the first event and second event may be sent in different data packets with associated headers. Both events are sent to the application processor 106 by the connection between the touch controller 102 and the application processor 106 through standard communication protocols, such as I2C or SPI. As previously described, the grip rejection information may include in an embodiment all of the raw data extracted from the touch. In an embodiment, the grip rejection information may include processed data of the touch such as major width of the touch, the minor width of the touch, the maximum signal strength of the touch, the node count of the touch, and the edge signal strength ratio of the touch. FIG. 7 along with description below describe how the grip rejection information is organized to be sent to the application processor 106.

The steps performed at the touch controller 102 are complete after the touch controller 102 transmits the touch coordinates and the grip rejection information to the application processor 106. The grip rejection method processes the remaining steps of the method with the application processor 106. The first process performed by the application processor 106 of the grip rejection method is in box 404.

In box 404, the application processor 106 receives the touch coordinate event and the grip rejection information event that have been sent by the touch controller 102. The application processor 106 uses information provided by the touch controller 102 and combines the information with application information that is available to the application processor 106. This combination improves grip distinguishing capabilities, which is not possible if the touch controller 102 independently performs the grip rejection determination.

After receiving the touch coordinate event and the grip rejection information event from the touch controller 102 at the application processor 106, the grip rejection method proceeds to box 405. In box 405, the application processor 106 checks the application information that is only available to the application processor 106. The application information can be a number of different kinds of information provided to the application processor 106 by different devices included in the electronic device. The application information comprises the orientation status of the electronic device (such as the device is positioned in a vertical, or horizontal orientation), what applications are currently active on the device (such as a game being played, or a video being displayed on the device), and a grip rejection dynamic valid area (an area of the touch screen that an application wants to ignore touch events in). Examples of such information may include a user playing a certain game or the use of a certain app that has touch buttons at certain locations of the touch screen.

For example, in an embodiment, a game is running on the electronic device and the orientation of the device is consistent with the horizontal orientation. In this example, the application processor 106 would know typical grip configurations of the electronic device when held in the horizontal orientation and with a game running. The application processor 106 would also know the grip rejection dynamic valid area that the game wants to reject touch events located in.

Once the application processor 106 has checked the application information of the electronic device, the grip rejection method continues to box 406. In box 406, the application processor 106 uses the information from the touch controller 102 and the application information to determine to reject or to pass the touch event on the touch screen by using different grip rejection algorithms. All of the grip rejection algorithms are implemented in tandem with the application information in the application processor 106 to further improve the grip rejection method's proficiency and accuracy. From the grip rejection information provided by the touch controller 102, the application processor 106 determines the grip type, such as edge thumb and corner palm, or more. An accurate determination of the grip type achieves better performance for grip rejection.

In box 406, the different grip rejection algorithms comprise proximity rejection, palm rejection, pressure rejection, finger shape analysis, gesture recognition, and multitouch analysis. In proximity rejection, the grip rejection algorithm detects touch inputs that occur close to the edges of the touch screen, and assumes that these touch inputs are unintended touches caused by the user's grip. In palm rejection, the grip rejection algorithm identifies and rejects touch inputs that occur simultaneously within a large area of contact, which is characteristic of a user's palm resting on the touch screen. In pressure rejection, the grip rejection algorithm utilizes the pressure-sensitive capabilities of the touch screen by detecting touch inputs with low pressure or light contact, and then considering those touch inputs accidental touches from the user's grip. In finger shape analysis, the grip rejection algorithm analyzes the shape and size of touch inputs, and the algorithm distinguishes between the unique patterns created by fingers as opposed to those caused by other objects or unintended touches. In gesture recognition, the grip rejection algorithm identifies specific gestures or patterns associated with intentional touches, such as swipes, taps, or pinches, and filters out touch inputs that do not match recognized patterns. In multitouch analysis, the grip rejection algorithm analyzes the number and arrangement of touch inputs, and the multitouch algorithms can differentiate intentional multitouch interactions from accidental touches caused by the user's grip.

All of the grip rejection algorithms used in box 406 incorporate the application information from the application processor 106 to improve their accuracy. As an example, in the proximity rejection grip rejection algorithm case, the application processor 106 may use the information from the touch controller 102 in the grip rejection algorithm as well as the dynamic valid area from an open application on the electronic device to further reduce the active monitoring area for touch inputs on the touch screen. As another example, in the palm rejection grip rejection algorithm case, the application processor 106 may use the touch information from the touch controller 102 and the orientation status of the electronic device from the application information, to determine an edge palm case and reject the large area of contact around the edge of the electronic device.

After completing the steps of box 406, the grip rejection method has determined to pass or reject the touch event. If the touch event is determined to pass the grip rejection method, the touch information will be passed to any application currently executing on the electronic device for actions associated with the executing application (such as, clicking a button). If the touch event is determined to be rejected by the grip rejection method, the touch information will not be passed to any applications executing on the electronic device, hence the touch event is rejected (ignored). Once the application processor 106 has determined whether to pass or reject the touch event (box 406), the grip rejection method returns to a state of waiting for a new touch event to occur on the touch screen of the electronic device. In addition, as the grip rejection method is performed in a restricted portion of the OS, the applications cannot corrupt the output from the grip rejection method.

Figure 5:
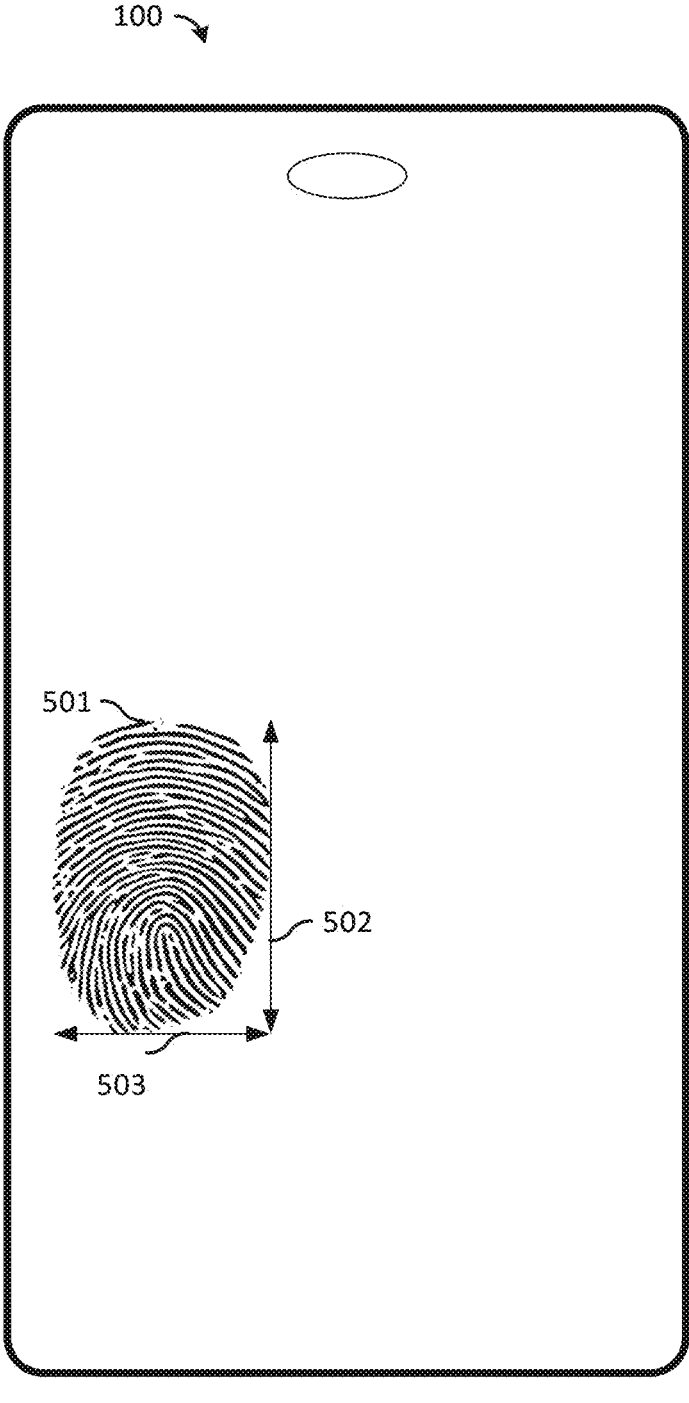
FIG. 5 is an illustration of a touch on an electronic device with a touch screen in accordance with some embodiments.

Example touch events are illustrated in FIGS. 5-6.

FIG. 5 shows an example touch event on the electronic device 100, in an embodiment. In FIG. 5, the electronic device 100 of this disclosure is depicted as a smartphone. The electronic device 100 is in a vertical orientation, which is information that is known by the application processor. The touch event depicted in FIG. 5 is a thumb touch 501. As was detailed previously, two elements of the grip rejection information that are passed to the application processor by the touch controller are the major and minor widths of the touch event. Illustrated in FIG. 5 is the thumb touch 501, which has a major width 502, and a minor width 503.

The minor width 503 of the thumb touch 501 is the largest width of the thumb touch 501 that is parallel to the minor (or smaller dimension) side of the electronic device 100. In other words, the minor width 503 is the width of the thumb touch 501 in the smaller side of the electronic device 100. The major width 502 of the thumb touch 501 is the largest width of the thumb touch 501 that is parallel to the major (or larger dimension) side of the electronic device 100. In other words, the major width 502 is the width of the thumb touch 501 in the larger side of the electronic device 100. Both the major width 502, and the minor width 503 of the thumb touch 501 would be determined by the touch controller of electronic device 100 and passed to the application processor 106 to determine whether to reject/pass the thumb touch 501.

FIG. 6 shows an example touch event on the electronic device 100, in an embodiment. In FIG. 6, the electronic device 100 of this disclosure is depicted as a smartphone. The electronic device 100 is in a horizontal orientation, which is information that is known by the application processor. The touch event depicted in FIG. 6 has a palm touch 602, which is illustrated at the bottom-left corner of the screen. Above and to the right of the palm touch 602 is a corresponding thumb touch 601 of the touch event. In the grip rejection method of this disclosure, the application processor would determine that the palm touch 602 is the result of a user's palm touching the touch screen, and that the thumb touch 601 is the result of the user's thumb touching the touch screen.

An example scenario for the touch event illustrated in FIG. 6 would be the case of a user playing a game on the electronic device 100. In an embodiment, the thumb touch 601 would be determined as a valid touch and passed by the grip rejection method of this disclosure. The palm touch 602 would be rejected by the grip rejection method of this disclosure. The application processor of the electronic device 100 would use the touch coordinate information and the grip rejection information passed to it by the touch controller, as well as the application information (in this case, the game running on the device and the horizontal orientation of the device) to determine that the palm touch 602 is a result of the way the electronic device is gripped. The application processor 106 would use a grip rejection algorithm (such as the palm rejection algorithm) to determine that the palm touch 602 corresponds to a grip type called corner palm. By incorporating the application information as well, the grip rejection method may determine the corner palm may be a result of the game running on the device having a dynamic grip area, which the application processor would know to reject touch events within that area of the touch screen.

Traditional grip rejection algorithms that are implemented in the touch controller have a difficult time with corner palm grip type events, like the touch event illustrated in FIG. 6. Traditional grip rejection algorithms executed in the touch controller would likely pass both the palm touch 602 and the thumb touch 601 illustrated in FIG. 6. An advantage of the grip rejection method of this disclosure is the improved grip type determination proficiency that is possible when the grip rejection algorithms are implemented by the application processor of the electronic device 100 and include the application information.

As a result of incorporating the additional information from the application processor, the application processor can more accurately determine to reject the palm touch 602, and to pass the thumb touch 601 as an intentional touch. The application processor 106 knows the orientation of the electronic device 100 (horizontal orientation), and can use the additional information from the game application running on the electronic device 100 to help determine the grip rejection for the touch event.

Illustrated in FIG. 7 is a table showing how the grip rejection information event that is passed from the touch controller to the application processor is organized. The grip rejection information event is contained in 8 bytes. The rows of the table are individual bytes and are the different elements that are parts of the grip rejection information. The columns of the table correspond to the 8 individual bits that comprise each of the 8 bytes of the grip rejection information event. The columns (individual bits) are organized as going from Bit0 to Bit7 read from right to left. The rows (individual bytes) are organized as going from Byte0 to Byte7 read from top to bottom.

The first row (starting from the top) corresponds to Byte0 and contains a Touch ID that is assigned to the touch event and is also used to determine the touch coordinate information event that corresponds to the same touch event (both the touch coordinate information event and the grip rejection information event are tagged with the same Touch ID). Bit0-Bit1 are shown in FIG. 7 to be filled with "0x2," which is a hexadecimal expression that means "10" in binary. Thus, that means that Bit1 is set to 1, and Bit0 is set to 0. Bit2-Bit5 contain the Touch ID of the corresponding touch event's grip rejection information stored in the grip rejection information event. Bit6-Bit7 are reserved.

The second row corresponds to Byte1 and contains the minor width of the touch event. All 8 bits of Byte1 are used for the minor width of the touch event.

The third row corresponds to Byte2 and contains the major width of the touch event. All 8 bits of Byte2 are used for the major width of the touch event.

The fourth row corresponds to Byte3 and contains the edge signal strength ratio of the touch event. All 8 bits of Byte3 are used for the edge signal strength ratio of the touch event.

The fifth row corresponds to Byte4 and contains the node count of the touch event. All 8 bits of Byte4 are used for the node count of the touch event.

The sixth row corresponds to Byte5 and contains the first 8 bits (bit 0-7) of the maximum signal strength value of the touch event. As a result of the maximum signal strength value's capability of being a large range of values, the maximum signal strength value requires 16 bits (or 2 bytes) to fully express the maximum signal strength values. Thus, this element of the grip rejection information is split into two bytes where the first 8 bits are contained in Byte5. Bit0-Bit7 correspond to bits 0-7 of the maximum signal strength value.

The seventh row corresponds to Byte6 and contains the second 8 bits (bit 8-15) of the maximum signal strength value of the touch event. As a result of the maximum signal strength value's capability of being a large range of values, the maximum signal strength value requires 16 bits (or 2 bytes) to fully express the maximum signal strength values. Thus, this element of the grip rejection information is split into two bytes where the second 8 bits are contained in Byte6. Bit0-Bit7 correspond to bits 8-15 of the maximum signal strength value. Bit0 corresponds to bit 8, Bit1 corresponds to bit 9, etc. Bity corresponds to bit 15 of the maximum signal strength value of the touch event.

The eighth row corresponds to Byte7 and contains the event left count. The event left count corresponds to the amount of events that are still in the buffer. The application processor uses this information to read events an amount of times that corresponds to the event left count. The event left count is stored in Bit0-Bit5. Bit6-Bit7 are reserved.

Figure 8:
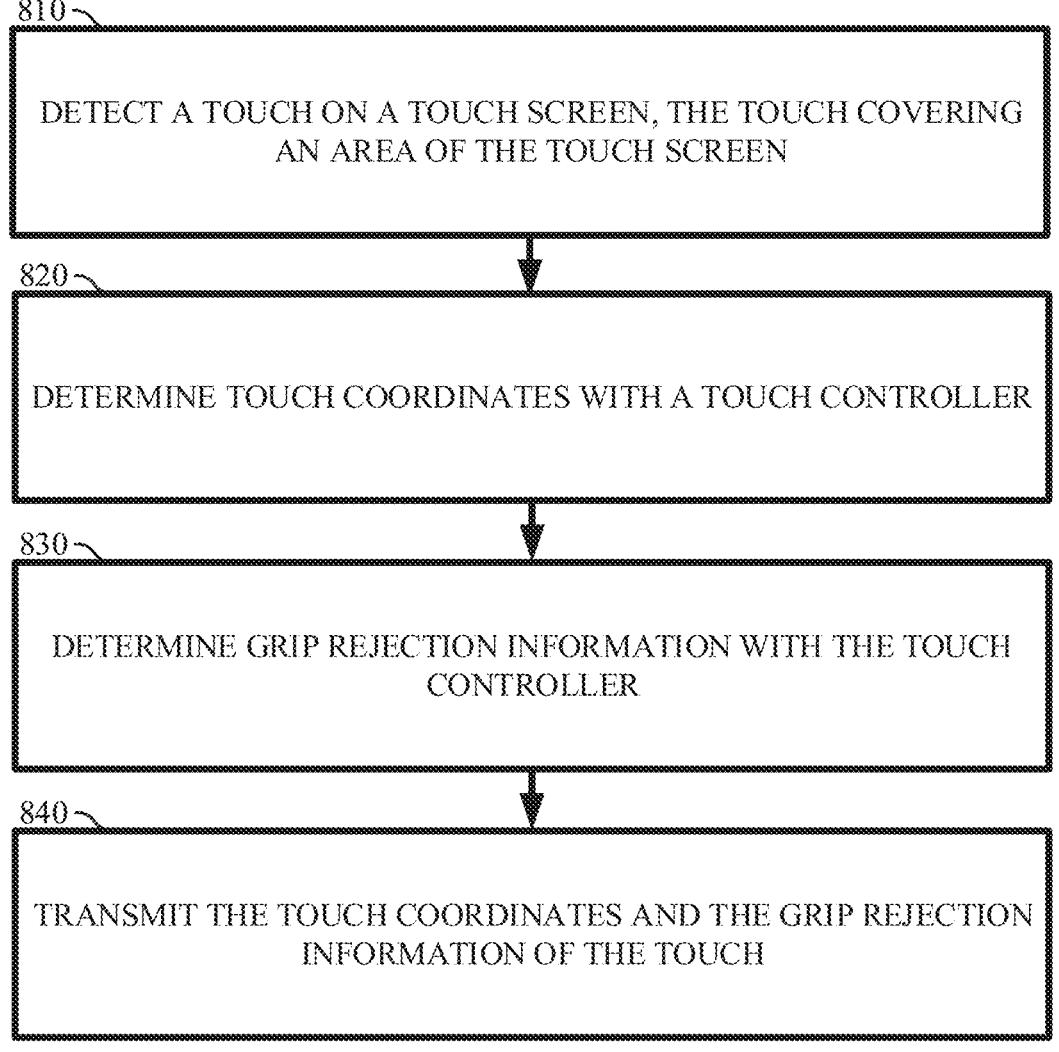
FIG. 8 illustrates a flow chart illustrating a gesture rejection method in accordance with some embodiments.

Once the grip rejection information event determined by the touch controller is passed to the application processor in the organizational manner illustrated in FIG. 7, the application processor uses that information to accurately determine a grip rejection classification for the touch event. FIG. 8 is a flow chart illustrating embodiments of the present disclosure.

In an embodiment, a grip rejection method includes detecting a touch on a touch screen, where the touch covers an area of the touch screen (box 810). The grip rejection method includes determining touch coordinates representing the touch area with a touch controller (box 820). The grip rejection method includes determining grip rejection information with the touch controller (box 830). The grip rejection information includes signal strength information of the touch. The grip rejection method includes transmitting the touch coordinates and the grip rejection information of the touch (box 840).

The various boxes described above may be implemented as further described using FIG. 4 above. For example, in an embodiment, box 820 may be implemented as box 401 in FIG. 4.

Example embodiments of the invention are described below. Other embodiments can also be understood from the entirety of the specification as well as the claims filed herein.

Example 1. A grip rejection method includes detecting a touch on a touch screen, where the touch covers an area of the touch screen. The grip rejection method includes in response to detecting a touch, determining touch coordinates representing the touch area with a touch controller. The grip rejection method includes in response to determining the touch coordinates with the touch controller, determining grip rejection information with the touch controller, where the grip rejection information includes signal strength information of the touch. The grip rejection method includes transmitting the touch coordinates and the grip rejection information of the touch.

Example 2. The method of example 1, further includes receiving the touch coordinates and the grip rejection information transmitted from the touch controller at an application processor. The grip rejection method further includes, based on the touch coordinates, the grip rejection information, and application information available at the application processor of an electronic device, determining a grip classification of the touch by executing a grip rejection algorithm with the application processor.

Example 3. The method of one of examples 1 or 2, where the signal strength information includes a minor width of the touch that corresponds to the small width side of the touch screen. The signal strength information includes a major width of the touch that corresponds to the large width side of the touch screen. The signal strength information includes a maximum signal strength value that corresponds to the maximum value reported to the touch controller by a touch sensor of the touch screen for the touch. The signal strength information includes a node number of the touch that corresponds to the number of nodes of the touch controller occupied by the touch. The signal strength information includes an edge signal ratio that corresponds to a sum of the outer edge signal strengths of the touch compared to a sum of the inner edge signal strengths of the touch.

Example 4. The method of one of examples 1 to 3, where the application information available at the application processor includes the electronic device's orientation status, where the orientation status includes whether the electronic device is in a horizontal or a vertical orientation.

Example 5. The method of one of examples 1 to 4, where the application information available at the application processor includes a dynamic area of the touch screen that touch events that occur within the dynamic area will be rejected while an application is active on the electronic device.

Example 6. The method of one of examples 1 to 5, where the application information available at the application processor includes the applications active on the electronic device.

Example 7. The method of one of examples 1 to 6, where the application information available at the application processor includes the electronic device's orientation status, the orientation status includes whether the electronic device is in a horizontal or a vertical orientation. The application information available at the application processor includes a dynamic area of the touch screen that touch events that occur within the dynamic area will be rejected while an application is active on the electronic device. The application information available at the application processor includes the applications active on the electronic device.

Example 8. The method of one of examples 1 to 7, where the grip rejection algorithm includes proximity rejection, palm rejection, pressure rejection, finger shape analysis, gesture recognition, and multitouch analysis, in combination with the application information available at the application processor.

Example 9. The method of one of examples 1 to 8, where the touch coordinates are transmitted in a first event.

Example 10. The method of one of examples 1 to 9, where the grip rejection information is transmitted in a second event.

Example 11. The method of one of examples 1 to 10, where the grip rejection information transmitted in the second event includes 8 Bytes numbered 0-7, where Byte 0 includes the Touch ID of the touch. Byte 1 includes the minor width of the touch. Byte 2 includes the major width of the touch. Byte 3 includes the edge signal strength ratio of the touch. Byte 4 includes the node count of the touch. Byte 5 includes the first 8 bits of the maximum signal strength value of the touch. Byte 6 includes the second 8 bits of the maximum signal strength value of the touch. And Byte 7 includes the event left count.

Example 12. An electronic device includes a touch screen, and a touch controller coupled to a memory storing instructions to be executed in the touch controller. The instructions when executed cause the touch controller to detect a touch on a touch screen, the touch covering an area of the touch screen. The instructions when executed further and in response to detecting a touch, determine touch coordinates representing the touch area with the touch controller. The instructions when executed further and in response to determining the touch coordinates with the touch controller, determine grip rejection information with the touch controller, where the grip rejection information includes signal strength information of the touch. The instructions when executed further transmit the touch coordinates and the grip rejection information of the touch.

Example 13. The device of example 12, further includes an application processor of the electronic device coupled to a second memory storing a second set of instructions to be executed in the application processor. The second set of instructions when executed cause the application processor to receive the touch coordinates and the grip rejection information transmitted from the touch controller, and based on the touch coordinates and the grip rejection information and information available at the application processor of the electronic device, determine a grip classification of the touch by executing a grip rejection algorithm with the application processor.

Example 14. The device of one of examples 12 or 13, where to determine the signal strength information, the touch controller is programmed to determine a minor width of the touch that corresponds to the small width side of the touch screen. The touch controller is programmed to determine a major width of the touch that corresponds to the large width side of the touch screen. The touch controller is programmed to determine a maximum signal strength value that corresponds to the maximum value reported to the touch controller by a touch sensor of the touch screen for the touch. The touch controller is programmed to determine a node number of the touch that corresponds to the number of nodes of the touch controller occupied by the touch. And the touch controller is programmed to determine an edge signal ratio that corresponds to a sum of the outer edge signal strengths of the touch compared to a sum of the inner edge signal strengths of the touch.

Example 15. The device of one of examples 12 to 14, where the application information available at the application processor includes the electronic device's orientation status, the orientation status including whether the electronic device is in a horizontal or a vertical orientation.

Example 16. The device of one of examples 12 to 15, where the application information available at the application processor includes a dynamic area of the touch screen that touch events that occur within the dynamic area will be rejected while an application is active on the electronic device.

Example 17. The device of one of examples 12 to 16, where the application information available at the application processor includes the applications active on the electronic device.

Example 18. The device of one of examples 12 to 17, where the application information available at the application processor includes the electronic device's orientation status. The orientation status includes whether the electronic device is in a horizontal or a vertical orientation. The application information available at the application processor includes a dynamic area of the touch screen that touch events that occur within the dynamic area will be rejected while an application is active on the electronic device. And the application information available at the application processor includes the applications active on the electronic device.

Example 19. The device of one of examples 1 to 18, where the grip rejection algorithm includes proximity rejection, palm rejection, pressure rejection, finger shape analysis, gesture recognition, and multitouch analysis, in combination with the information known by the application processor.

Example 20. The device of one of examples 12 to 19, where the touch coordinates are transmitted in a first event.

Example 21. The device of one of examples 12 to 20, where the grip rejection information is transmitted in a second event.

Example 22. The device of one of examples 12 to 21, where the grip rejection information transmitted in the second event includes 8 Bytes numbered 0-7, where Byte 0 includes the Touch ID of the touch. Byte 1 includes the minor width of the touch. Byte 2 includes the major width of the touch. Byte 3 includes the edge signal strength ratio of the touch. Byte 4 includes the node count of the touch. Byte 5 includes the first 8 bits of the maximum signal strength value of the touch. Byte 6 includes the second 8 bits of the maximum signal strength value of the touch. And Byte 7 includes the event left count.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for grip rejection, the method comprising:
detecting a touch on a touch screen, the touch covering an area of the touch screen;
in response to detecting the touch, determining touch coordinates representing a touch area with a touch controller;
in response to determining the touch coordinates with the touch controller, determining grip rejection information with the touch controller, the grip rejection information comprising signal strength information of the touch; and
transmitting the touch coordinates and the signal strength information of the touch from the touch controller to an application processor, wherein the signal strength information is transmitted in a second event comprising a plurality of Bytes, the plurality of Bytes comprising a Touch ID of the touch in one Byte, an edge signal strength ratio of the touch in one Byte, and a maximum signal strength value of the touch in two Bytes.

2. The method of claim 1, further comprising:
receiving the touch coordinates and the signal strength information transmitted from the touch controller at the application processor; and
based on the touch coordinates, the signal strength information, and application information available at the application processor of a device, determining a grip classification of the touch by executing a grip rejection algorithm with the application processor.

3. The method of claim 2, wherein the application information available at the application processor comprises an orientation status of the device, the orientation status comprising whether the device is in a horizontal or a vertical orientation.

4. The method of claim 2, wherein the application information available at the application processor comprises a dynamic area of the touch screen that touch events that occur within the dynamic area will be rejected while an application is active on the device.

5. The method of claim 2, wherein the application information available at the application processor comprises:
an orientation status of the device, the orientation status comprising whether the device is in a horizontal or a vertical orientation;

a dynamic area of the touch screen that touch events that occur within the dynamic area will be rejected while an application is active on the device; and applications active on the device.

6. The method of claim 2, wherein the grip rejection algorithm comprises proximity rejection, palm rejection, pressure rejection, finger shape analysis, gesture recognition, and multitouch analysis, in combination with the application information available at the application processor.

7. The method of claim 1, wherein the signal strength information comprises:

a minor width of the touch that corresponds to a small width side of the touch screen;

a major width of the touch that corresponds to a large width side of the touch screen;

the maximum signal strength value that corresponds to a maximum value reported to the touch controller by a touch sensor of the touch screen for the touch;

a node count of the touch that corresponds to a number of nodes of the touch controller occupied by the touch; and the edge signal strength ratio that corresponds to a sum of outer edge signal strengths of the touch compared to a sum of inner edge signal strengths of the touch.

8. The method of claim 7, wherein the second event comprises 8 Bytes numbered 0-7, wherein:

Byte 0 comprises the Touch ID of the touch;

Byte 1 comprises the minor width of the touch;

Byte 2 comprises the major width of the touch;

Byte 3 comprises the edge signal strength ratio of the touch;

Byte 4 comprises the node count of the touch;

Byte 5 comprises a first 8 bits of the maximum signal strength value of the touch;

Byte 6 comprises a second 8 bits of the maximum signal strength value of the touch; and Byte 7 comprises an event left count.

9. The method of claim 1, wherein the touch coordinates are transmitted in a first event.

10. A device comprising:

a touch screen;

a touch controller coupled to an application processor and a memory storing instructions to be executed in the touch controller, the instructions when executed cause the touch controller to:

detect a touch on the touch screen, the touch covering an area of the touch screen;

in response to detecting the touch, determine touch coordinates representing a touch area with the touch controller;

in response to determining the touch coordinates with the touch controller, determine grip rejection information with the touch controller, the grip rejection information comprising signal strength information of the touch; and transmit the touch coordinates and the signal strength information of the touch from the touch controller to the application processor, wherein the touch coordinates are transmitted in a first event and the signal strength information is transmitted in a second event comprising a plurality of Bytes, the plurality of Bytes comprising a Touch ID of the touch in one Byte, an edge signal strength ratio of the touch in one Byte, and a maximum signal strength value of the touch in two Bytes.

11. The device of claim 10, further comprising:

a second memory storing a second set of instructions to be executed in the application processor, the second memory coupled to the application processor, the second set of instructions when executed cause the application processor to:

receive the touch coordinates and the signal strength information transmitted from the touch controller; and based on the touch coordinates and the signal strength information and application information available at the application processor of the device, determine a grip classification of the touch by executing a grip rejection algorithm with the application processor.

12. The device of claim 11, wherein the application information available at the application processor comprises an orientation status of the device, the orientation status comprising whether the device is in a horizontal or a vertical orientation.

13. The device of claim 11, wherein the application information available at the application processor comprises a dynamic area of the touch screen that touch events that occur within the dynamic area will be rejected while an application is active on the device.

14. The device of claim 11, wherein the application information available at the application processor comprises:

an orientation status of the device, the orientation status comprising whether the device is in a horizontal or a vertical orientation;

a dynamic area of the touch screen that touch events that occur within the dynamic area will be rejected while an application is active on the device; and applications active on the device.

15. The device of claim 11, wherein the grip rejection algorithm comprises proximity rejection, palm rejection, pressure rejection, finger shape analysis, gesture recognition, and multitouch analysis, in combination with the application information known by the application processor.

16. The device of claim 10, wherein to determine the signal strength information, the touch controller is programmed to:

determine a minor width of the touch that corresponds to a small width side of the touch screen;

determine a major width of the touch that corresponds to a large width side of the touch screen;

determine the maximum signal strength value that corresponds to a maximum value reported to the touch controller by a touch sensor of the touch screen for the touch;

determine a node count of the touch that corresponds to a number of nodes of the touch controller occupied by the touch; and determine the edge signal strength ratio that corresponds to a sum of outer edge signal strengths of the touch compared to a sum of inner edge signal strengths of the touch.

17. The device of claim 16, wherein the second event comprises 8 Bytes numbered 0-7, wherein:

Byte 0 comprises the Touch ID of the touch;

Byte 1 comprises the minor width of the touch;

Byte 2 comprises the major width of the touch;

Byte 3 comprises the edge signal strength ratio of the touch;

Byte 4 comprises the node count of the touch;

Byte 5 comprises a first 8 bits of the maximum signal strength value of the touch;

Byte 6 comprises a second 8 bits of the maximum signal strength value of the touch; and Byte 7 comprises an event left count.

18. A method for grip rejection, the method comprising:

detecting a touch on a touch screen, the touch covering an area of the touch screen;

in response to detecting the touch, determining touch coordinates representing a touch area with a touch controller;

in response to determining the touch coordinates with the touch controller, determining grip rejection information with the touch controller, the grip rejection information comprising signal strength information of the touch; and transmitting the touch coordinates and the signal strength information of the touch from the touch controller to an application processor, the touch coordinates being transmitted in a first event, the signal strength information being transmitted in a second event, the second event comprising 8 Bytes, wherein one Byte comprises a Touch ID of the touch, and wherein two Bytes comprise a maximum signal strength value of the touch.

\* \* \* \* \*